Patented May 9, 1950

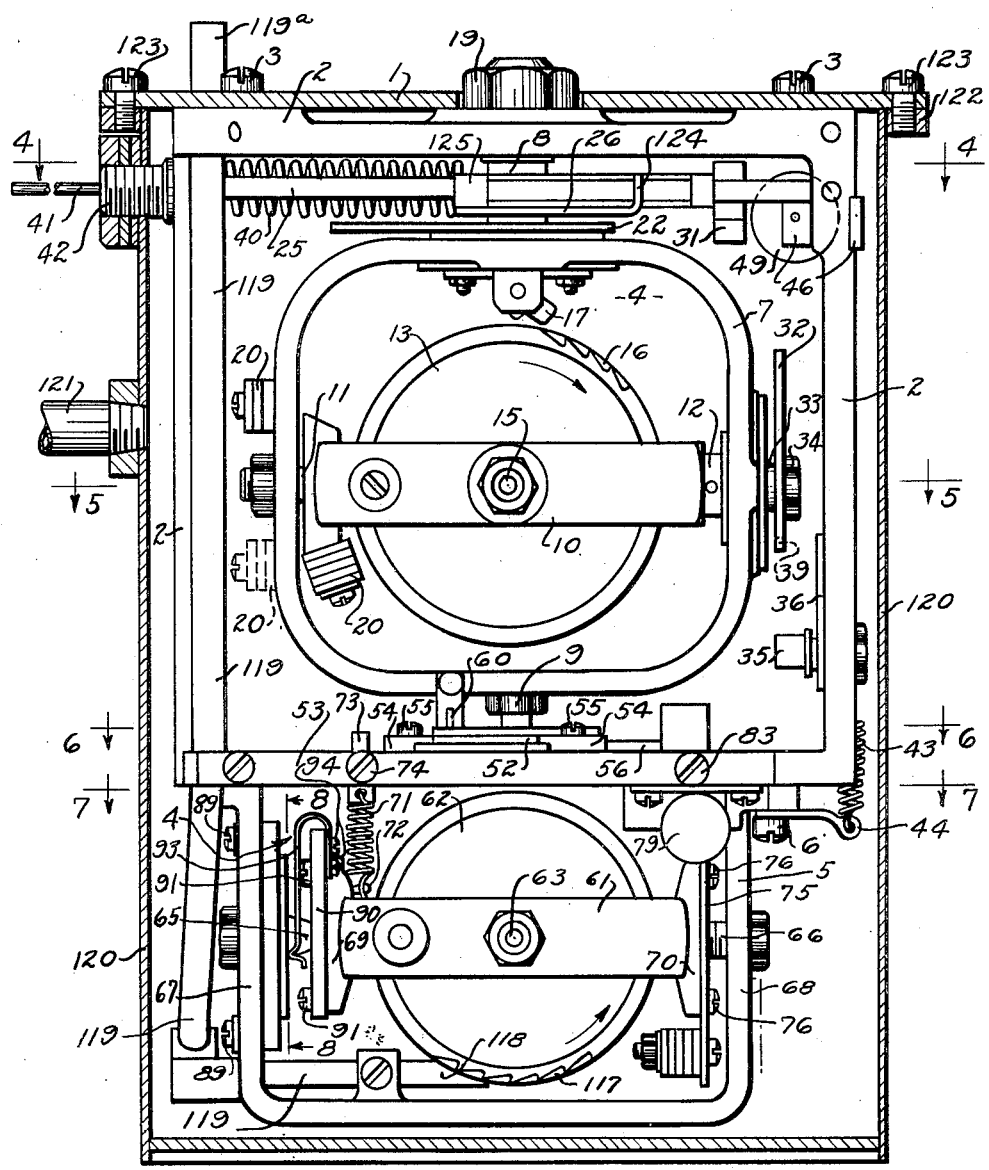

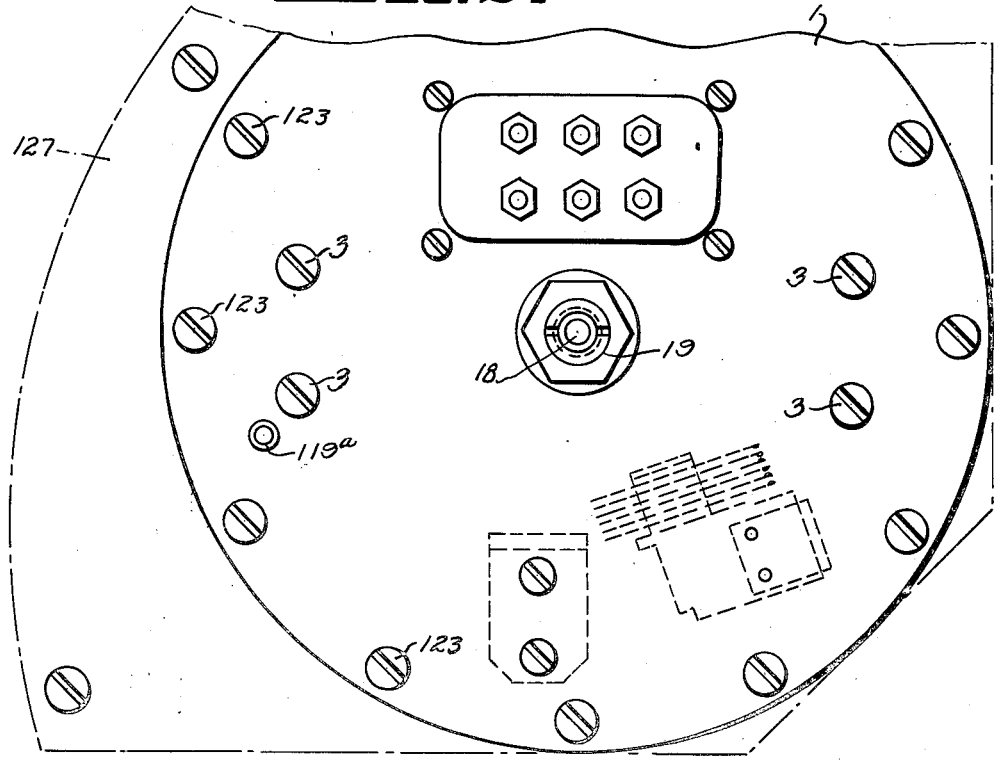
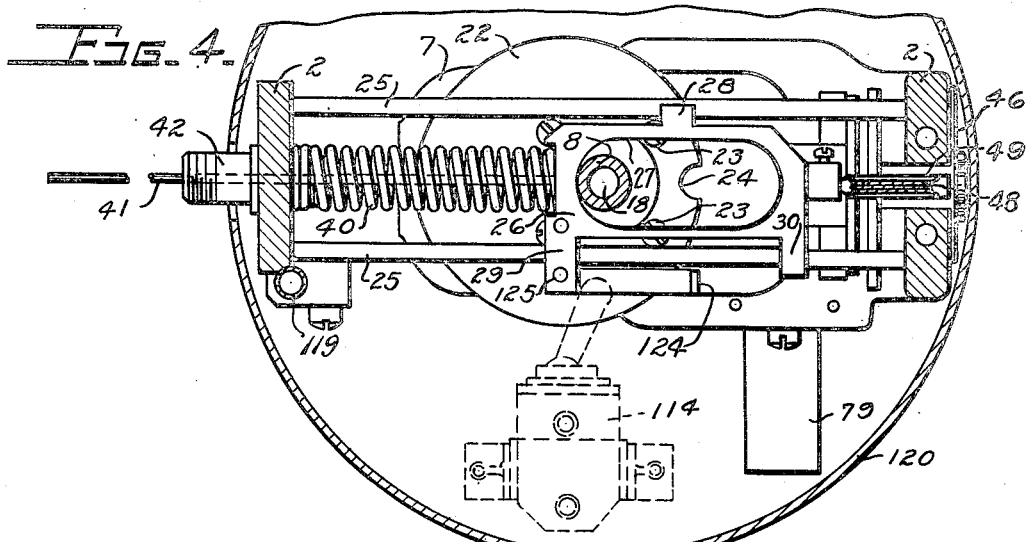

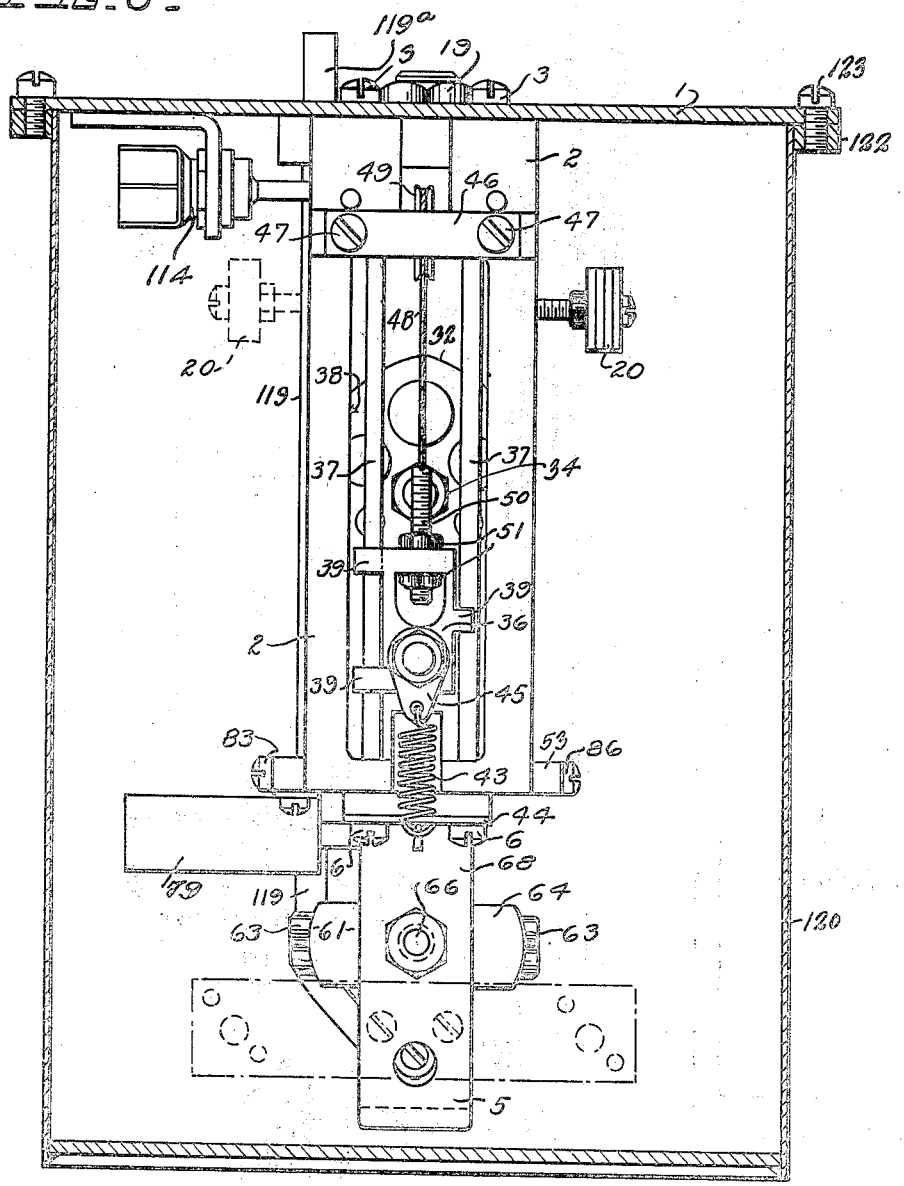

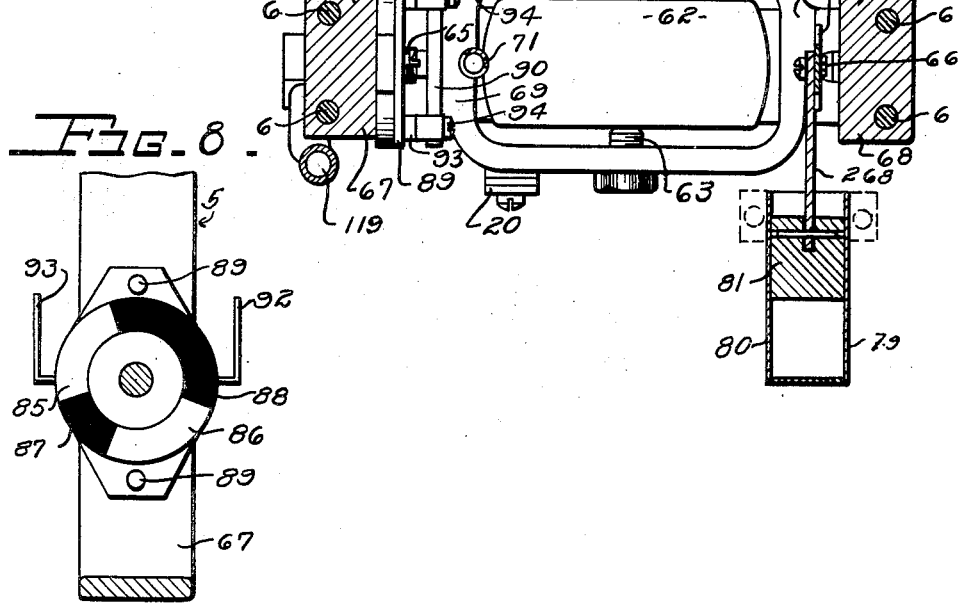
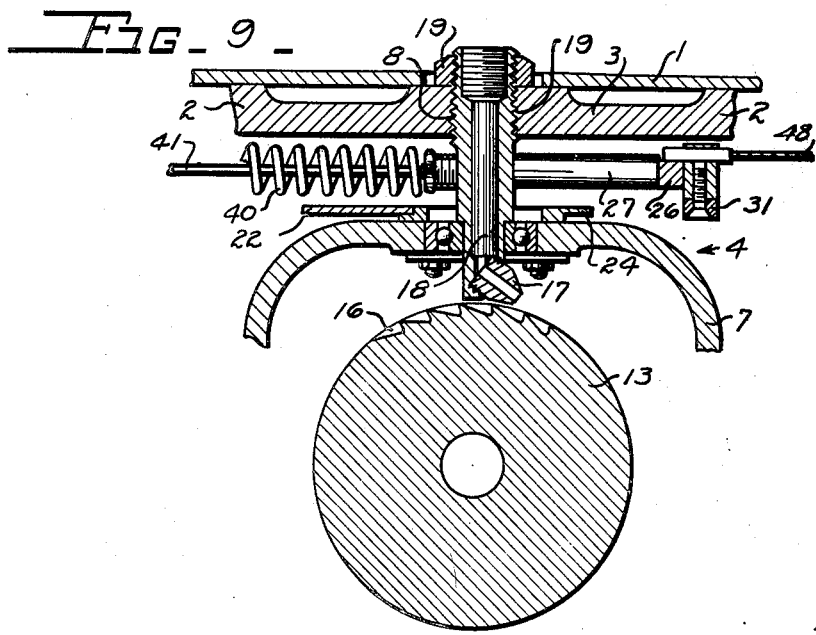

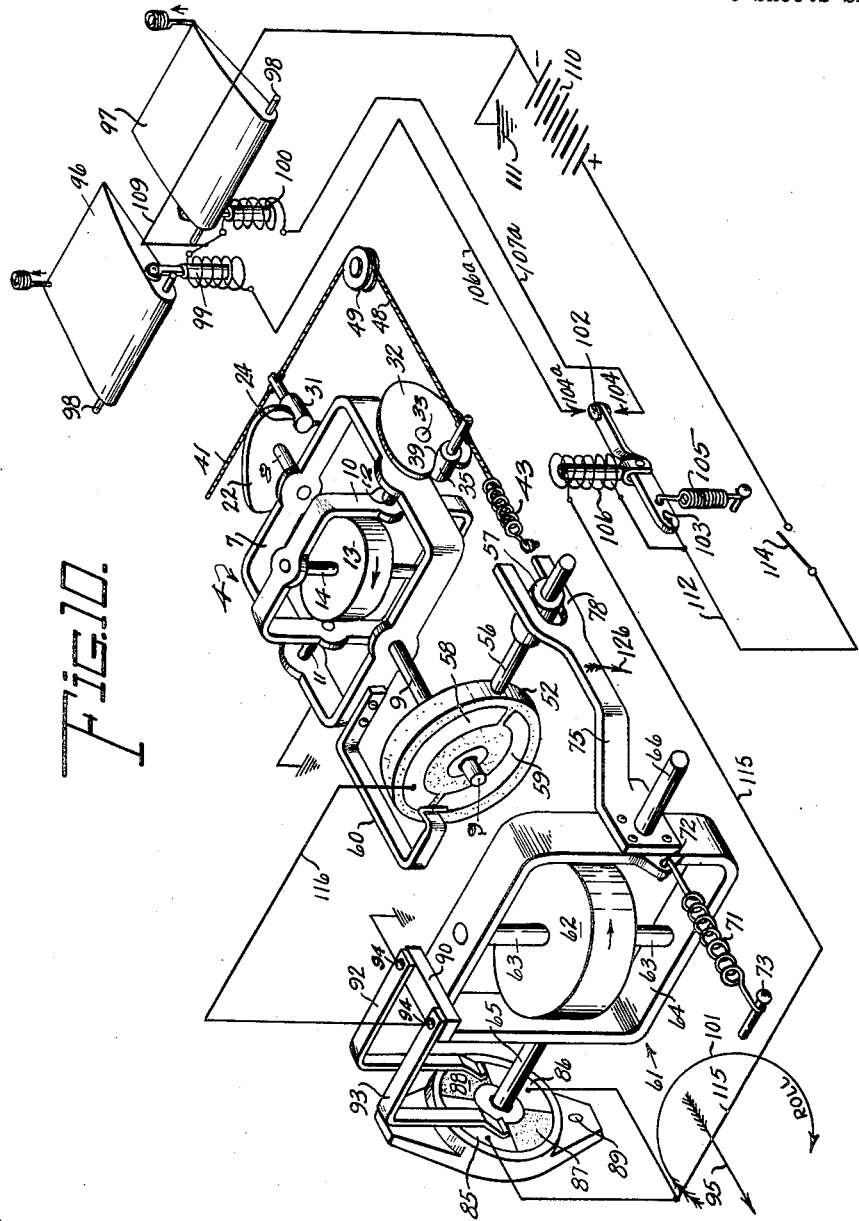

2,507,451

UNITED STATES PATENT OFFICE 2,507,451

FLIGHT STABILIZING CONTROL GYROSCOPE

Julius P. Molnar, Oakmont, and Anthony Carnvale, Pittsburgh, Pa., assignors to the United States of America as represented by the Secretary of War Application July 1, 1944, Serial No. 543,168

7 Claims. (Cl. 74—5.34)

This invention relates to flight stabilizing control means for remotely controlled flight bodies, such as bombs, dirigible projectiles and the like, for stabilizing the flight thereof about their neutral flight axes during directional movement thereof toward the target after release from an elevated support, such as an airplane and, more particularly, the invention appertains to stabilizing gyroscope control means for automatically stabilizing these flight controlled bodies during their flight to prevent rotation thereof, or excess oscillation about their flight axes during their travel from the point of release to the target to which they are directed.

In flight controlled bodies of the above-noted types, stabilizing gyroscope means have been employed to control the direction and application of torque to the flight controlled bodies to oppose rotation or oscillation of the bodies about their neutral or flight axes. Rate gyroscopes have also been employed to supplement the control of the main or stabilizing gyroscopes, operable incident to predetermined relative rates of rotative displacement or roll of the flight bodies about their flight axes to afford better stabilizing control in an attempt to reduce excessive hunting or oscillation during their flight to the target. Some of these flight control devices include provisions for holding the gyroscope rotors caged prior to release of the flight body from the supporting plane, and for maintaining the gyroscope rotors in operation while in caged positions.

An object of the present invention is the provision of improved stabilizing control means for stabilizing the flight of remotely controlled bombs, projectiles and similar bodies to more efficiently control their rotative displacement or oscillation about their neutral flight axes to reduce oscillation or roll-over tendencies of the same to a minimum when dropped or released from the supporting plane, which affords more accurate flight control to the selected target.

Another object is the provision of stabilizing flight control means in the form of an improved gyroscope structure comprising a support adapted to be fixed to the flight control body, in which a main stabilizing gyroscope and an associated rate of turn gyroscope are mounted, including stabilizing control actuating means intermediate the gyroscopes and movably carried by the support, arranged to be shifted by the rate gyroscope in proportion to the angular displacement of the rate gyroscope spin axis, to modify the stabilizing control relation between the movable stabilizing control actuating means and the main stabilizing gyroscope means in a predetermined ratio to the angular displacement of the spin axis of the rate gyroscope, to vary the application of stabilizing control to the flight control body in a definite ratio to the rate of rotative displacement of the flight body.

A further object is the provision of flight stabilizing control actuating means for flight bodies including a main stabilizing gyroscope and a cooperating shiftable control member for controlling the application of corrective torque to the flight body incident to rotative displacement of the body about its flight axis, in which a rate gyroscope is provided, carried by the support and variably responsive to the rate of rotative displacement of the body about its flight axis for shifting the cooperating shiftable control member relative to the main gyroscope to vary the cooperating control relation therebetween in a predetermined ratio to the relative displacement of the rate gyroscope spin axis, and releasable gyroscope retaining means for holding the gyroscopes in predetermined oriented positions with respect to the flight body prior to the release of the flight body from the supporting plane.

A further object is the provision of gyroscope control means for stabilizing the flight of a flight controlled body having flight control surfaces operable to control the rotative displacement of the body about its flight axis so tthat when the rate of rotative displacement of the body from a neutral position is below a predetermined rate of roll or rotative displacement, as determined by the rate gyroscope, the control surfaces are immediately actuated to apply a corrective torque to the body to return the body to its neutral position and, if the rate of return of the body toward its neutral position is still below the minimum predetermined rate, as controlled by the rate gyroscope, the corrective torque is applied to the body, rotating the same toward the neutral position, but if the rate of return exceeds the predetermined minimum rate of return, as controlled by the rate gyroscope, the control surfaces are operated to apply an opposing torque to the body prior to its return to neutral position, the initiation of the opposing torque being controlled by the displacement of the rate of roll gyroscope incident to the rate of return of the body toward its neutral position.

A further object is the provision of means whereby when the rate of roll or rotation of the flight body exceeds the predetermined maximum rate, as determined by the rate gyroscope, a negative torque opposing the rotative displacement of the body is applied by the control surfaces so long as the rate of roll exceeds the maximum, regardless of the position of the body relative to its initial reference position.

Another object is the provision of improved stabilizing gyroscope means for flight control apparatus such as dirigible projectiles, bombs, etc., in which a support is provided carrying a main stabilizing gyroscope mounted for universal freedom in plural gimbal means, and the provision of a flight controlling commutator member shiftable on the support and arranged to electrically cooperate with the stabilizing gyroscope gimbal means upon rotative displacement of the stabilizing gyroscope gimbal means in either direction with respect to the flight controlling commutator member. This controls the application of corrective torque to the support to return the flight controlling commutator member to its former reference relation with respect to the stabilizing gyroscope gimbal means, and includes a gimbaled rate gyroscope responsive to the rate of rotative displacement of the support having an operating connection with the shiftable flight controlling commutator member for shifting the same relative to the stabilizing gyroscope gimbal means to vary the control relation between the stabilizing gyroscope gimbal means and the shiftable flight controlling member in predetermined ratio to the relative displacement of the rate gyroscope gimbal means with reference to the support.

A still further object is the provision of improved caging means for simultaneously orienting the plural gimbal means for the stabilizing gyroscope rotor having releasable gimbal locking means, and the provision of means for rotating the gyroscope rotor when it is in caged and locked position.

Another object is the provision of a stabilizing gyroscope gimbaled on a support for universal freedom about mutually perpendicular intersecting axes including cooperating stabilizing circuit controlling commutator means rotatably mounted on the support to cooperate with circuit controlling means, operable by relative rotative movement of the gimbal means in one direction from a fixed reference position on the support to energize a torque controlling circuit, and arranged to energize a second torque controlling circuit upon relative rotative movement of the gimbal means in the opposite direction from the reference position, including the provision of a rate gyroscope having its spin axis gimbaled on the support for yieldable tilting precession incident to rotative displacement of the support, and an operating connection between the circuit controlling commutator means and the rate gyroscope gimbal means for shifting the commutator means relative to the stabilizing gyroscope gimbal means, and separate circuit controlling means between the rate gyroscope gimbal means and the support, operable incident to predetermined displacement of the rate gyroscope gimbal means with respect to the support to energize a torque controlling circuit.

A still further object is the provision of a gyroscope rotor mounted for universal freedom in gimbal members journaled to rotate on mutually perpendicular intersecting axes, and separate caging and locking means shiftably carried by the gimbal support to orient the gimbals to predetermined reference positions on the support and lock the same in said positions, including means for simultaneously moving each caging and locking means to operative position, and resilient means for yieldably urging each caging and locking means to inoperative position.

Other objects and advantages of the invention will become apparent from the following description taken in connection with the accompanying drawings in which like reference characters refer to like parts in the several figures.

Fig. 1 is a vertical section taken through our improved stabilizing control device showing the gimbal supporting frame and gyroscope rotor elements in elevation.

Fig. 2 is a fragmentary top plan view of our improved stabilizing control unit, a portion of the auxiliary supporting plate being shown in phantom.

Fig. 3 is a vertical sectional view through the gyroscoe casing showing the gyroscope frame structure in elevation.

Fig. 4 is a fragmentary horizontal sectional view taken through the gyroscope unit approximately on the plane indicated by the line 4—4 in Fig. 1.

Fig. 7 is a sectional view taken approximately on line 7—7 of Fig. 1, the gyroscope casing being omitted.

Fig. 8 is a detailed sectional view taken approximately on the line 8—8 in Fig. 1.

Fig. 9 is a fragmentary detailed vertical sectional view taken approximately on the line 9—9 of Fig. 4.

Fig. 10 is a diagrammatic perspective view of our improved gyroscope disclosing a schematic application of the same to the ailerons or flight control surfaces of a flight body, including a wiring diagram for controlling the operation of the flight control surfaces.

Figure 5:
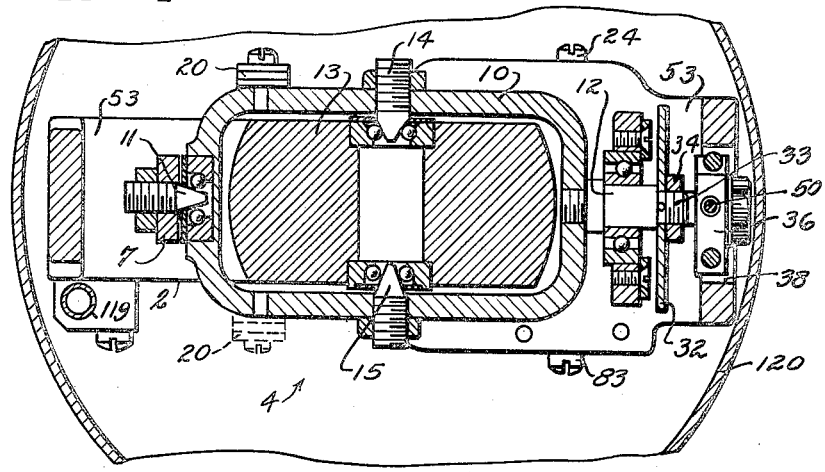
Fig. 5 is a sectional view taken on the plane indicated by line 5—5 in Fig. 1, portions of the casing being broken away.

Referring more particularly to Figs. 1, 2 and 3 of the drawings, the reference numeral 1 indicates a circular top or supporting plate for the gyroscope unit, and a rectangular gyroscope support or frame 2 is secured to the underside of the circular plate 1 by suitable fastenings, such as screws 3. The support or frame is open on both sides and carries therein the gimbaled stabilizing gyroscope 4 mounted for universal freedom. A U-shaped open frame, or main frame extension 5 is secured to the lower side of the frame 2 by suitable screw fastenings 6. This frame carries gimbaled therein a rate gyroscope, later referred to.

The main or stabilizing gyroscope structure 4 includes an outer gimbal 7 rotatably journaled in the support 2 on upper and lower journals or trunnions 8 and 9 disposed on an axis perpendicular to the top plate 1 and the upper and lower end members of the frame 2. An inner gimbal member 10 is journaled in the outer gimbal member 7 on trunnions 11 and 12 disposed in suitably frictionless bearings in the outer gimbal member on an axis perpendicular to the outer gimbal axis and preferably intersecting the outer gimbal axis. The gyroscope rotor 13 for the main gyroscope 4 is journaled for rotation in the inner gimbal member 10 on an axis perpendicular to the tilting axis of the inner gimbal in the outer gimbal on trunnions 14—15. This structure provides universal tilting freedom for the spin axis of the rotor. In the form of rotor operating means disclosed in the drawing I provide the periphery of the rotor with the usual air pockets or buckets 16 arranged to receive the air blast or fluid jet tangentially projected against the periphery of the rotor 13 from a fixed jet 17 secured in the lower end of a fluid delivery passage 18 extending through the upper journal or fixed trunnion member 8 for the outer gimbal member 7. This upper hollow journal is fixed in the upper frame end member by a nut 19 secured on the threaded end of the tubular trunnion 8 and drawn tight. This arrangement causes the fluid jet passing from the jet nozzle 17 to rotate the rotor 13 when the same is in a predetermined reference position in the main frame 2, as disclosed in Fig. 1 of the drawings, this being the caged or oriented position in which the main gyroscope spin axis is retained up to the time that it is uncaged to establish its stabilizing control when the flight body carrying the gyroscope is released from its carrier or supporting airplane for its controlled flight to the target.

As previously mentioned, this gyroscope device is primarily designed for use in connection with flight controlled bodies, such as dirigible bombs, flight controlled projectiles and similar apparatus, which may be either directed from their point of release to the target by remote or radio control or by any suitably preset controlling mechanism carried within the flight controlled body, this mechanism, not forming a part of the present invention, is neither shown in the drawings nor described in any detail in the specification.

The main purpose of this invention is to maintain the flight body stable about its flight axis after its release from the supporting plane so that the same will not oscillate excessively about its flight axis, and to prevent any tendency of the flight body rolling over and thus rendering the just-mentioned directional control apparatus inaccurate as to the dirigible flight control of the body.

In order to balance the main gyroscope gimbal mountings and compensate for any precession thereof during operation, suitable adjustable weight members 20 of customary types are employed.

Caging, locking and release means for the gimbal members 7 and 10 for holding the rotor spin axis of the main rotor oriented in the main frame are provided, consisting of two caging and release devices, one for each gimbal member. The outer gimbal frame portion through which the trunnion 8 passes has a heart-shaped orienting cam member 22 fixed thereto by the screw fastenings 23 so that rotation of the cam member rotates the outer gimbal. The periphery of the cam opposite its apex is formed with a semicircular locking notch 24. Extending between the two side members of the frame, adjacent the end frame member, next to the circular supporting plate 1 are secured parallel guide bar members 25, on which are slidably mounted the outer gimbal orienting and release means 26, consisting of a frame having an elongated opening 27 surrounding the trunnion 8 and arms 28, 29 and 30 slidably engaging the guide rods 25.

Referring more particularly to Fig. 9, the right-hand end of the slide frame carries a camming and locking roller 31 disposed in the plane of the heart-shaped cam so that movement of the slide frame 26 to the left causes the roller 31 to engage the periphery of the cam 22 rotating the cam and gimbal until the roller drops into notch 24, which locks the cam 22 and gimbal 7 in oriented position on the main frame 2. A similar orienting, caging and locking means is provided for the inner gimbal member 10, consisting of a heart-shaped orienting cam member 32 fixed on the end of the extension 33 formed on the end of the inner gimbal trunnion 12. A nut 34 secures the cam in keyed position on the extension, as best seen in Fig. 5, so that when the outer gimbal is oriented, as seen in Fig. 1, the heart-shaped cam member 32, just referred to, is in the plane of a roller 35, carried by a slide frame 36, which is, in turn, slidably carried on a pair of parallel guide rods 37 carried, as best seen in Fig. 3, by the main frame 2, in an opening 38 formed therein.

This latter slide frame 36 is also provided with guide or supporting arms 39 engaging the guide rods 37.

The heart-shaped cam 32 is also provided with a locking notch 39 for the reception of the roller 35 upon movement of the camming or slide frame 36 upwardly from the position shown in Fig. 1 toward the plane of movement of the inner gimbal axis. A spring 40 is interposed between the frame 2 and the slide frame 26 for moving the frame 26 to release the roller 31 from the notch 24, and a caging and locking actuator in the form of a wire or cable 41 extends through a suitable guide bushing 42 and axially through the spring 40 and is secured at one end to the slide plate 26. The other end of this wire or cable 41 is connected to any suitable release mechanism, not shown, in order to provide a release of this wire or cable when the bomb or flight body carrying our gyroscope device is dropped or released from the plane carrying the same.

The other caging and locking plate 36 for the inner gimbal member is also provided with a release spring 43 connected at one end to an eye in the plate 44 secured to the flange of the rate gyroscope frame 5, as best seen in Fig. 1, the other end of the spring being connected to an eye plate 45 secured to the stud on which the roller 35 is mounted. Still referring to Fig. 1, and to Figs. 3 and 4, the frame is provided with a pulley bracket 46, suitably secured by fastenings 47. The two plates 26 and 36 are connected for simultaneous caging, locking and release movements by a flexible operating connection or cable 48 which is passed over a guide pulley 49 carried in the bracket 46 with the opposite ends of the cable secured to the slide plates 26 and 36. The slide plate 36, as best seen in Fig. 3, is provided with means for adjusting the relative operative length of the cable 48, comprising a screw threaded rod 50 to which the end of the cable 48 is attached. The rod passes through an opening in the slide frame, and nuts 51 are provided for fixing the rod 50 in its adjusted position so that the locking rollers 31 and 35 may be simultaneously moved into the recesses 24 and 39 as the two gimbals are oriented to their predetermined reference positions with respect to the supporting frame 2, upon the application of tension to the caging wire 41. Since the slide plate 36 for caging and locking the inner gimbal 10 is secured by the flexible cable 48 to the outer gimbal locking plate 26 and the spring 43 moves the locking plate 36 to release position, this spring 43, through the cable 48, moves the other, or outer, gimbal plate 36 to release position, assisted by the spring 40. Release of the gimbal caging and locking wire or cable 41 therefore causes simultaneous movement of the caging and locking means to release position while the application of tension to the cable or wire causes the caging and locking devices for the two gimbals to orient the gimbals and simultaneously lock the gimbals in their predetermined oriented positions.

A stabilizing circuit-controlling commutator member 52 is rotatably mounted on the lower cross member 53 with the axis of the outer gimbal member as a center, the journal 9 for the outer gimbal 7, passing through this commutator, is journaled in a suitable antifriction bearing in the frame cross member 53. The commutator member 52 is preferably in the form of an annular flanged disc, as best seen in Figs. 1, 3 and 10, held in place by keeper members or clips 54 secured on the cross member 53 by screw fastenings 55 with undercut portions receiving the annular flange around the periphery of the commutator. The commutator member 52 is shiftable with respect to the main frame 2 by a handle rod 56 terminating in a ball-shaped head 57 adapted to be shifted by the rate gyroscope, later to be described.

Figure 6:
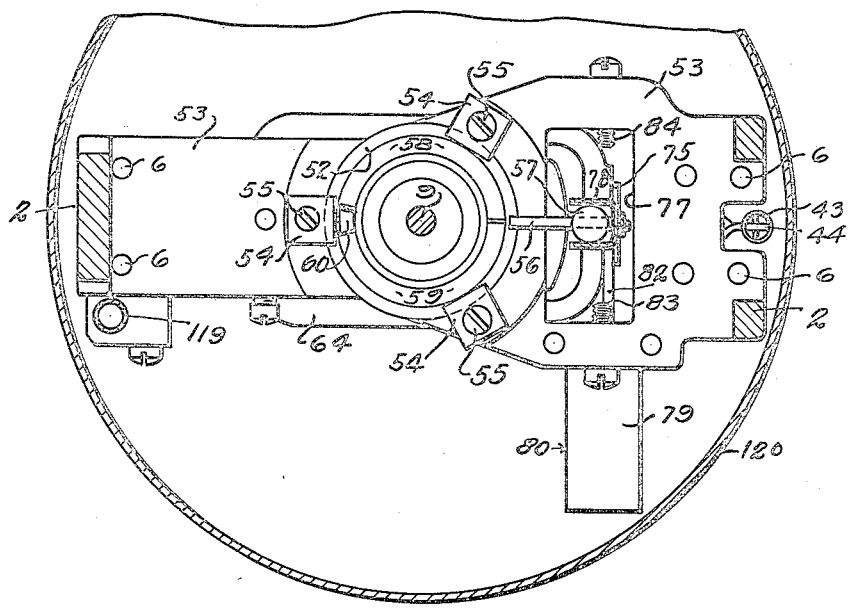
Fig. 6 is a cross sectional view taken approximately on the plane indicated by line 6—6 in Fig. 1.

The commutator member 52, as best seen in Figs. 6 and 10, is provided with stabilizing circuit controlling contact means in the form of semicircular contact strips 58 and 59, insulated from each other and from the disc proper in any suitable manner.

Referring to Figs. 1, 2 and 10, the outer gimbal member 7 is provided with a flexible contact finger or blade 60 disposed to engage one or the other of the contact strips 58—59 upon relative rotary displacement between the gimbal 7 and the rotatably mounted commutator member 52 from a fixed reference position on the frame 2, this relative rotary movement controlling the application of rotative torque to the support to restore the former reference positions of the gimbal and commutator with respect to the support or frame.

The rate of roll or rate of rotative displacement controlling gyroscope is indicated generally at 61 and includes a rate gyroscope rotor 62 having its spin axis mounted for rotation on trunnion members 63, fixed in a gimbal member 64 having its axis disposed perpendicular to the axis of the rotor. The gimbal member 64 is carried on bearing members or trunnions 65 and 66, projecting from the side bar members 67 and 68 of the frame extension 5, riding in suitable antifriction bearings (not shown) fitted in the enlarged ends 69 and 70.

The rate gyroscope is yieldably and adjustably stabilized in the frame extension 5 by a coil tension spring 71 connected at one end, as indicated at 72 to the rate gimbal 64, just above the rate gimbal tilt axis while the other end of the spring is secured to a rod 73 adjustably secured in the frame cross member 53 by a set screw 74.

The rate gyroscope gimbal member 64 has secured to its enlarged end 70, as best seen in Figs. 1 and 7, an actuating plate member 75, screws 76 providing the securing means therefor.

This plate 75 extends upwardly through an enlarged opening 77 formed in the frame cross member, the upper extremities of the plate being bent to form a U-shaped actuating member 78 to snugly receive the ball-shaped head or termination 57 of the handle member 56 carried by the commutator member 52. Rocking movement of the rate gyroscope gimbal means actuates the handle member 56 carried by the shiftable commutator member 52 to change the contact relation between the contact finger 60 on the outer gimbal 7 of the stabilizing gyroscope and the contact segments 58 and 59 of the commutator member 52. A dashpot 79 is secured to the cross frame member 53 for controlling the rate of precession of the rate gyroscope gimbal 64 incident to the rotative displacement of the supporting frame about an axis perpendicular to the gimbal axis.

The dashpot is of conventional construction, comprising a cylinder 80, piston 81 and the rod connection 82 between the piston and the actuating plate 75, also stop screws 83 and 84 are threadably received in the cross frame member 53 and project into the opening 77, in the path of movement of the actuating plate 75 to limit the degree of tilt of the rate gimbal member 64 and consequently limit the amount of relative displacement between the stabilizing circuit controlling commutator member and the frame 2.

Referring more particularly to Figs. 1, 7 and 8 of the drawings, the U-shaped frame extension 4 carrying the rate gyroscope is provided with an annular contact member or ring comprising spaced contact segments 85 and 86 and intermediate insulating segments 87 and 88. This ring is secured to the side frame member 67 in insulating relation thereto by suitable fastening members 89 and surrounds the trunnion 65 of the rate gyroscope gimbal member 64.

The left-hand end of the rate gyroscope gimbal member, as seen in Figs. 1 and 7, carries an insulating plate 90 secured thereto by screw fastenings 91, this insulating plate carrying a pair of light flexible contact strips or springs 92 and 93 secured thereto by screws 94, the ends of the springs 92 and 93 being in contact with the ring so that tilting precession of the rate gimbal incident to rotative displacement of the support causes relative displacement of the contacting portions of the spring blades 92 and 93 with respect to the contact and insulating segments 85 to 88 of the ring.

When the rate gyroscope is in stabilized position in the frame extension 5, as seen in Figs. 8 and 10, the contact blade 93 is in contact with the contact segment 85 while the contact blade 92 is in engagement with the insulating segment 88. Displacement of the rate gyroscope gimbal in one direction beyond a predetermined angular displacement moves the contact blade 93 on to the insulating segment 87 while the contact blade 92 still remains on the insulating segment 88. Tilting displacement of the rate gyroscope in the opposite direction beyond the aforementioned angular displacement causes the contact blade 92 to engage the contact element 86 while the contact blade 93 still remains in contact with the contact segment 85.

Referring particularly to Fig. 10, the arrow 95 indicates the neutral flight axis and flight direction of the gyroscope unit when the same is mounted in a flight controlled body such as a dirigible bomb or projectile. Torque applying means are provided on this body in the form of conventional flight control surfaces or aileron members 96 and 97, hinged at 98 to the rear end of the flight controlled body. Servomotors are preferably provided for actuating the respective ailerons 96 and 97, these power actuating members being shown in the drawings in the form of solenoid magnets 99 and 100.

Actuation of the aileron 96 causes rotative torque to be applied to the flight body in the direction of the curved arrow 101 while actuation of the solenoid 100 causes reverse application of torque to the flight body through the aileron 97, in a direction opposite to the curved arrow 101. An on-and-off relay device is preferably provided comprising a spring loaded armature contact blade 102 pivoted at 103 and normally held in circuit closing contact with a contact 104 by a spring 105. Magnetic means are provided, as indicated at 106, which, when energized, cause the armature contact blade to be shifted, making a contact with the contact 104a.

Circuit closing conductor wires 106a and 107a, respectively, connect the solenoid coils 99 and 100 to the relay contacts 104a and 104. The opposite ends of the solenoid coils 99 and 100 are connected together with a common feed wire 109 leading from the two magnetic coils to one side of the battery unit 110 with an interposed ground connection 111 grounded either to the frame of the flight body or to the gyroscope frame.

An electrical conductor 112 leads from the opposite side of the battery 110 to the relay contact blade 102, and to one side of the relay magnet means or coil 106. The other side of the magnet coil 106 is connected by a conductor 115 to both of the contact segments 85 and 86 of the annular contact ring that is fixed to the frame 67 of the rate gyroscope.

The contact blade 93, shiftable with the rate gyroscope gimbal, is insulated from the gimbal member 64, but is connected by a flexible conductor 116 to the semicircular contact ring 58 in the shiftable commutator member 52 carried on the main frame. The other contact blade 92 is grounded on the frame so as to establish a circuit to the negative side of the battery 110 through the other ground connection 111 when the contact blade 92 engages the contact segment 86 with the contact blade 93 in contact with the contact segment 85. This energizes the relay magnet 106, closing the circuit to the solenoid 99 to cause actuation of the aileron member 96.

The rate gyroscope is driven, in the form disclosed in Figs. 1 and 7 of the drawings, like the main stabilizing gyroscope, by a fluid jet directed substantially tangentially against the periphery of the rotor, which is preferably provided with buckets 117, of conventional form, machined therein. The fluid jet is formed in the end portion 118 of the fluid conduit 119 which leads alongside the main frame and extension to a point 119a exteriorly above the circular supporting plate 1. The gyroscope unit is preferably disposed in a casing or air tight closure 120 having a suction tube 121 in the wall thereof, the casing being in the form of a cylindrical can member having a flanged rim 122 which is secured in sealed relation against the plate 1 by the screw members 123.

When in operation, the air is withdrawn from the interior of the container 120 through the tube 121, creating a partial vacuum within the container. Air then enters the tubular conduits 119 and 18 to relieve the semivacuum in the container, this air being directed as it leaves these conduits against the peripheries of the two gyroscopes, causing rotation of the gyroscope wheels 13 and 62.

In the operation of the device, as the flight body is suspended on the plane, the caging wire 41 is maintained under tension, holding the two slide plates 26 and 36 carrying the two camming and locking rollers 31 and 35 in the respective notches 24 and 39 of the gimbal-orienting cams 22 and 32. The switch 114, as shown in Fig. 4, controlling the circuit to the on-and-off relay device, is disposed in circuit interrupting position by engagement of the projection 124 carried by the gimbal orienting frame 26. Air is withdrawn from the casing 120 by a suitable pump on the supporting plane, and a rubber slip connection between the pump and the tube 121, so that when the flight body is released from the plane for its flight to the target, this connection is withdrawn, and simultaneously the gimbal caging and locking wire 41 is released, permitting the slide frames 26 and 36 to free the two gimbal members 7 and 10. The projection 125 on the slide frame 26 throws the control switch 114 into operative position.

Referring now to Fig. 10, should the flight body rotate about its flight axis in either direction, the stabilizing gyroscope 4, being stationary in space, will cause the contact finger 60 to be displaced with respect to the commutator member 52. The direction of displacement and the movement of the contact finger on to either the contact strip 58 or the contact strip 59 will depend on the direction of rotation of the flight body about its flight axis. Should this roll or rotation be slow or below the minimum rate as set by the rate gyroscope, the rate gyroscope will not be shifted materially and the relationship between the two contacts 92 and 93 on the rate gyroscope, and the contact segments 85 and 86 on the rate gyroscope frame will not be changed, nor will the arm or shifter plate 75 move the commutator member 52 materially with respect to the frame. The result is that a negative aileron will be applied to exert opposing torque to the rotation of the flight body, and this negative torque will continue so long as the rate of return does not exceed the minimum return rate as controlled by the rate gyroscope, that is, until the flight body is returned to its reference position, after which the contact finger 60 will engage the other contact, causing the on-and-off relay to apply reverse torque to the flight body.

Should the rate of roll or the rate of return exceed the minimum rate as controlled by the rate gyroscope and still be below the maximum rate as controlled by the restoring spring 71 the rate gyroscope gimbal will precess or tilt. This causes relative displacement between the commutator 52 and the contact finger 60 carried by the stabilizing gyroscope so that the contact finger passes from one of the semicircular contacts 58 or 59 to the other semicircular contact, thus applying a negative aileron control to the flight body before the same reaches the reference position, this negative control being adjusted in proportion to the rate of return of the flight body to the neutral axis.

In the event of a violent rotative displacement or accelerated return of the flight body with respect to its reference position the rate gyroscope will precess, shifting the gimbal 64 to its maximum tilted position. This displaces the two contact fingers 93 and 92 with respect to the contact segments 85 and 86, and depending upon the direction of rotative displacement the circuit to the on-and-off relay will be either broken or established, and will remain in this condition so long as the rate gyroscope remains in its extreme tilted position, thus causing the control surfaces 96 or 97 opposing this rotative displacement to remain in this opposing relation until the rate of rotation is reduced below the maximum control rate, as set by the adjustment of the rate gyroscope tilt opposing spring 71. Under these extreme displacement conditions, the circuit control between the shiftable commutator member 52 and the contact finger 60 on the stabilizing gyroscope 4 is interrupted and remains interrupted, thus cutting out the control of this stabilizing gyroscope until the rate of displacement or return of the flight body is reduced to a point below the maximum as controlled by the rate gyroscope.

In the return of the flight body from a displacement to its fixed reference position at a rate between the maximum and minimum as controlled by the rate gyroscope, assuming that the return is in the direction of the arrow 101, precession of the rate gyroscope gimbal will be in the direction of the arrow 125. This shifts the commutator member 52 with respect to the finger 60 so that the nearer end of the contact segment 59 is advanced toward the finger 60. The tilting of the rate gyroscope has shifted the two contact fingers 92 and 93 carried by the rate gyroscope onto the contact segments 85 and 86. The finger 60 is disposed on the contact segment 58 and, as the flight body rotates in the direction of the arrow 101, this finger 60, due to the stabilized position of the stabilizing gyroscope 4, moves relative to the contact plate 58 toward the end of the other insulated contact segment 59. While the finger 60 is on the segment 58, current flows from the battery 110 to the coil 99 and conductor wire 106a to the contact terminal 104a in the on-and-off relay, current also flowing from the battery to the ground, to the finger 60 and, through the contact segment 58 and flexible conductor 116, to the rate gyroscope contact finger 93. Since the rate gyroscope is displaced, current flows from the finger 93 through the contact 85 and wires 115 through the coil 106 of the on-and-off relay device back to the battery through the conductor 112, causing the armature contact blade 102 to engage the contact 104, thus completing the circuit from the flight control surface actuating coil 109 through the conductor 112 back to the battery 110.

As the rate of return diminishes slightly, the contact blade 92 disengages the contact segment 86 so that, as the stabilizing gyroscope contact finger 60 reaches the end of the contact segment 58, which is displaced, due to the tilt of the rate gyroscope, the coil 106 of the on-and-off relay device is deenergized, the spring 103 causing the contact blade 102 to disengage the contact 104a, deenergizing the coil 99, controlling the flight control surface 96.

The circuit is now established through the contact 104 and conductor 107a to the flight control surface actuating magnet coil 100. Applying a reverse torque to the flight body prior to its return to the fixed reference position and, as the flight body decelerates, the rate gyroscope returns to its stabilized position, shifting the reference plane between the two contact segments 59 and 58 with respect to the finger 60 so that the opposing torque will be discontinued as the flight body reaches its predetermined reference position.

In mounting the device in a flight controlled bomb the circular supporting plate 1 is preferably secured to a segmental plate 127 which is, in turn, secured in the bomb or flight body. The gyroscope device, as set forth herein is for the purpose of maintaining the flight body stable about its flight axis so that supplemental controls may be actuated to control the change of direction of the flight body.

While we have shown and described one particular exemplification of our invention, it is obvious that various modifications and changes may be made in the construction without departing from the spirit of the invention as set forth in the accompanying claims.

We claim:

1. In a gyroscope control apparatus of the class described, a support adapted to be stabilized about a neutral axis, shiftable stabilizing control means carried by said support, gyroscope means carried by said support for operating said stabilizing control means comprising a rotor journaled in gimbal means for universal freedom on the support, means for rotating said rotor, pickoff power control means between said gyroscope means and support for operating said stabilizing control means comprising a shiftable control operating member movably carried by the support, and a separate cooperating control member movable by said gimbal means, operable by relative displacement of the gimbal means in either direction relative to the support, due to the departure in either direction the rotor spin axis from a predetermined reference plane fixed relative to the support and passing through said neutral axis, to selectively operate said stabilizing control means to apply an opposing torque to the support to rotate the support about its aforementioned neutral axis to relatively return the rotor spin axis to said reference plane, a rate gyroscope, gimbal means therefor supporting said rate gyroscope on said support with its spin axis yieldably fixed in a predetermined reference plane at an angle to said neutral axis whereby rotary displacement of said support about its neutral axis in opposite directions at variable rates causes variable angular precession of the rate gyroscope spin axis with respect to the support in opposite directions relative to its last mentioned position in the reference plane, and operating means between said rate gyroscope gimbal means and the support carried shiftable control operating member for displacing the same relative to the said cooperating stabilizing gyroscope gimbal actuated pickoff power control operating member to vary the cooperating control relation therebetween in predetermined relation to the angular displacement of said rate gyroscope spin axis relative to the support.

2. In a gyroscope control device of the class described, a support, a gimbal member rotatably mounted thereon to turn about a relative vertical axis, a second gimbal member mounted on said first mentioned gimbal member to turn about a relative horizontal axis, a gyroscope rotor mounted in said second gimbal member with its rotary axis perpendicular to the turning axis of the second gimbal, caging means for the first gimbal member comprising a heart-shaped cam member fixed to the first mentioned gimbal member on its turning axis to rotate in a plane at right angles to said last turning axis, said cam member having a locking recess formed in the periphery thereof, a locking abutment member slidably carried by the support to move into camming engagement with said heart-shaped cam member to orient the same and first gimbal to a predetermined reference position on the support and to engage said locking recess when in oriented position, a second caging means for the second gimbal member including a heart-shaped cam member fixed to the second gimbal member on its turning axis to rotate in a plane at right angles to the second gimbal axis, said heart-shaped cam member being formed with a locking recess in its periphery, and a locking abutment member slidably carried by said support to move into camming engagement with said second heart-shaped cam member, when the first gimbal member is oriented by the first caging means, to orient the second gimbal member to a predetermined position in the first gimbal member, and to engage said locking recess in the second heart-shaped cam member when so oriented, spring means between said second abutment member and support for moving the said second abutment member to noncaging position, and a flexible connector connecting both caging abutment members for simultaneously moving the same to caging positions.

3. In a gyroscope device of the class described, a supporting frame, a gyroscope rotor journaled in said frame in a pair of gimbal members for universal freedom, separate caging means movably carried by the frame including an abutment member engageable with each gimbal member to orient each gimbal member to a predetermined reference position with respect to the frame, interlocking means forming a part of each caging means for locking the gimbal members in said predetermined oriented position, separate spring means between each caging means and the frame for moving each abutment member to noncaging position, a common actuating connector, connected to both abutment members for simultaneously moving the same to caging and interlocking position with respect to the respective gimbal means and holding the interlocking means in interlocking engagement with the gimbal members, and means for rotating said gyroscope rotor while said gimbal members are in said caged and locked positions.

4. In a stabilizing gyroscope of the class described, a support subject to rotative displacement about an axis, a gyroscope rotor, gimbal means journaled on the support and supporting the rotor spin axis in transverse relation to said support axis for universal tilting movement including an outer gimbal tiltable about said support axis, an inner gimbal carried by said outer gimbal having a tilt axis transverse to the outer gimbal tilt axis, releasable caging means engageable with the inner and outer gimbal means to maintain the spin axis of the rotor in a predetermined reference position with respect to the support axis, stabilizing circuit controlling commutator means rotatably mounted on the support for adjustment about the axis of the outer gimbal, contact means fixed on said commutator means, separate cooperating contact means fixed on said outer gimbal means to rotate therewith about the said outer gimbal and support axis upon relative rotative displacement of the outer gimbal means from its predetermined reference position to engage the commutator carried contact means, a rate gyroscope rotor having its spin axis gimbaled on said support transverse to the axis thereof, to precess in a fixed plane from a predetermined reference position in said plane incident to rotative displacement of the support about said support axis, actuating means between the commutator means and the rate gyroscope gimbal means for rotatably adjusting the commutator means in a predetermined ratio to the tilting precession of the rate gyroscope gimbal means and rate gyroscope rotor spin axis, to adjust the position of the commutator carried contact means on the support with respect to the separate cooperating contact means on the first mentioned gimbal means upon predetermined tilting movement of the rate gyroscope gimbal means with respect to the support, and means between the support and rate gyroscope gimbal means for yieldably resisting tilting movement of the rate gyroscope on the support incident to rotative displacement of the support about the first mentioned axis for predetermining the ratio of tilt of the rate gimbal relative to the rate of rotation of the support about its axis.

5. In a stabilizing gyroscope device of the class described, a plurality of stabilizing control circuits, a support, a stabilizing gyroscope rotor gimbaled thereon in plural gimbal means for unlimited universal freedom, caging means engageable with the plural gimbal means for disposing the axes of the rotor and plural gimbal means perpendicular to each other, electrical pickoff control means between the gimbal means and support for energizing the stabilizing control circuits upon relative displacement between the gimbal means and the support comprising rotatably mounted stabilizing circuit controlling contact means on the support and separate cooperating circuit controlling contact means carried by the gimbal means to move therewith independently of the movement of the rotatably mounted stabilizing contact means to establish different stabilizing control circuit connections upon relative displacement of the gimbal means in opposite directions with respect to the support, a rate gyroscope gimbaled on the support in a single gimbal for limited freedom about a single axis, means between the single gimbal and the support for resiliently tensioning said rate gyroscope gimbal means for yieldably orienting the axis of the rate gyroscope to a predetermined reference plane with respect to the support, an operating arm fixed on said rate gyroscope gimbal means in actuating engagement with said rotatably mounted stabilizing circuit controlling contact member for angularly displacing said last mentioned contact member with respect to the gimbal carried contact means proportional to the rate gyroscope gimbal displacement to vary the stabilizing circuit control relation between the electrical pickoff control means in predetermined ratio to the tilting displacement between the rate gyroscope spin axis and the support.

6. In a gyroscope control device, a support, a gyroscope rotor gimbaled thereon in gimbal members for three degrees of freedom, caging means, for orienting said gimbal members to position the gyroscope rotor spin axis in a predetermined reference position, means for moving said caging means to non-operative position, means for rotating said gyroscope rotor while in oriented position, a pair of spaced, relatively insulated electrical pickoff control members comprising a shiftable power control electrical contact member rotatably carried by said support and an independently shiftable cooperating power control contact member fixed to the gimbal members to be actuated thereby, said contact members being engageable upon relative rotative displacement therebetween from a predetermined reference position, incident to movement of the gimbal members with respect to the support, or movement of rotatably carried independently shiftable power control contact member with respect to the support to actuate a stabilizing control member, a rate gyroscope rotor having its axis gimbaled on said support for tilting movement in a fixed reference plane, means for yieldably orienting the spin axis of said rate gyroscope to a predetermined reference position in said reference plane, and a positive operating connection between the rate gyroscope gimbal means and the shiftable power control electrical contact member for shifting the last mentioned contact member incident to relative movement of the rate gyroscope gimbal means to vary the relative contacting position of the electrical pickoff control members, in a predetermined ratio to the tilting displacement of the rate gyroscope rotor spin axis with respect to the support.

7. In a stabilizing gyroscope of the class described, a supporting frame, a first gimbal member journalled in said frame to rotate about an axis in a substantially vertical plane, a second gimbal member journalled on the first gimbal member to rotate about a substantially horizontal axis fixed in said first gimbal member, a gyroscope rotor journalled to rotate about an axis fixed in the second gimbal member perpendicular to the axis of the second gimbal member, means for rotating said gyroscope rotor, stabilizing circuit controlling contact means between said first gimbal member and said support adapted to control a stabilizing element including a commutator member movably mounted on the support to rotate about the axis of the first gimbal member and a separate cooperating contact blade member carried by the first gimbal member in engagement with said commutator member and independently shifted relative to the commutator member incident to rotary displacement of the first gimbal member to establish a stabilizing control effect on the said frame, a third gimbal member mounted on the frame to rotate about an axis perpendicular to the axis of the first gimbal member, a rate gyroscope journalled in said third gimbal member having a spin axis perpendicular to the axes of the first and third gimbal members, yieldable means connected between said third gimbal member and said frame for tensioning said third gimbal to yieldably stabilize the spin axis of the rate gyroscope rotor in a plane perpendicular to the axis of the first gimbal member, and a positive operating connection between the third gimbal member and said commutator member to variably rotate the commutator member about its axis in a predetermined ratio to the angular precession of the axis of the rate gyroscope with respect to the axis of the first gimbal member to vary the controlling relation of the commutator member aforesaid with respect to the first gimbal carried cooperating contact blade member, in accord with the relative angular precession of the axis of the rate gyroscope with respect to the supporting frame.

JULIUS P. MOLNAR.
ANTHONY CARNVALE.

REFERENCES CITED

The following references are of record in the file of this patent:

UNITED STATES PATENTS

| Number | Name | Date |
|---|---|---|
| 1,033,995 | Davison | July 30, 1912 |
| 1,788,807 | Sperry | Jan. 18, 1931 |
| 2,137,974 | Fischel | Nov. 22, 1938 |
| 2,350,769 | Kimball | June 6, 1944 |